Patented Oct. 21, 1924.

1,512,432

UNITED STATES PATENT OFFICE.

NORMAN UNDERWOOD, OF OAKTON, VIRGINIA.

PROCESS OF MAKING ARSENIC COMPOUNDS.

No Drawing.     Application filed September 7, 1922. Serial No. 586,765.

*To all whom it may concern:*

Be it known that I, NORMAN UNDERWOOD, a citizen of the United States, residing at Oakton, in the county of Fairfax and State of Virginia, have invented certain new and useful Improvements in the Process of Making Arsenic Compounds, of which the following is a full and complete specification.

The manufacture of inorganic metallic arsenical compounds for insecticides and other purposes has been accomplished in various ways and from numerous ingredients with varying results. So far as is known, however, the productions of these arsenical compounds has been considered separate problems requiring individual direct reactions having for their sole object the production of a single arsenical compound.

It is an object of my invention to combine in one procedure the manufacture of several useful arsenical compounds in their most favorable physical conditions, the production of each compound being benefited by the correlated production of another.

It is a further object of my invention to utilize the reaction attending the production of one arsenical compound for promoting or aiding in the production of a second such compound, this being well exemplified by the conjoint preparation of lead arsenate and Paris green.

It is also an object of my invention to carry out the above results with a minimum of by-products or waste products and also to recover certain of the re-agents in their original forms for repeated use in the cycle of operation.

Further objects of my invention will be apparent from the following description and claims wherein for purposes of example, and not desiring to limit myself thereto, I have set forth one preferred mode by which my invention may be carried out, it being evident to those skilled in the industry that numerous changes may be made in equivalents without departing from the spirit of my invention.

It is a well-known fact that oxidized compounds of lead, such as lead carbonate, are readily broken down by weak acids such as acetic acid to form the soluble lead salt. This applies equally as well to oxidized compounds of lead other than lead carbonate which is mentioned here merely as an example and not as a limitation upon the procedure.

Assuming for the purpose of example merely that lead carbonate is used, I add an aqueous solution of acetic acid and then an appropriate amount of copper sulphate. The interaction of these ingredients varies from the reaction obtained with the acetic acid alone, by the fact that the lead has a stronger affinity for the sulphur than has the copper and consequently there is formed a relatively insoluble compound of lead sulphate while the copper is taken up in the form of copper acetate.

This mixture is then filtered to separate the solution of copper acetate to which I add arsenious oxide and copper hydroxide producing the double compound of copper arsenite and acetate. In this manner I produce a relatively pure and isolated form of insecticide comparable with that commonly known as Paris green. The copper hydroxide serves to retain in the compound the acetic acid set free by the action of the arsenious oxide. The amount of insecticide thus formed is obviously greater than would be the case if the copper hydroxide were not present. In addition the final product does not require further treatment in order to account for the free acid which would be otherwise produced.

The lead salt resulting from the above reaction and existing in the form of a precipitate is in a state of relative great reactivity. This substance lends itself to the following procedure in a very effective manner. However, any commercial lead sulphate such as sublimed lead may be also used to advantage in carrying out the process. This lead compound is now agitated in water with an alkali metal hydroxide or an alkaline earth metal hydroxide, for example magnesium hydroxide or oxide by which the lead is converted to hydroxide with the production of magnesium sulphate or the like salt. This latter is separated by filtering or analogous steps and the remaining lead hydroxide treated with arsenic acid. The lead arsenate thus produced possesses great advantages for use in insecticidal preparations on account of the degree to which it may be subdivided and distributed. The use of the lead prepared as above indicated insures the rapid and complete carrying out of the reaction.

The magnesium sulphate removed from the lead compound can then either be converted into a valuable white base used in printing inks, coating for paper and the like by precipitation with an aqueous solution of calcium hydroxide or can be recovered for further use in the above reaction by precipitation with alkali metal hydroxides. The procedure above set out has manifest advantages in that the production of each of the arsenical compounds mentioned is aided by the presence of the second metal. Thus the production of copper acetate is carried out under the most advantageous conditions and to the greatest extent by reason of the action of the lead in withdrawing the sulphuric acid radical. Again the use of the weak acetic acid and copper sulphate insures the formation of lead sulphate which is admirably adapted for further treatment in the preparation of the lead arsenate. Moreover, it will be apparent that if it is desired to omit the separation of the lead sulphate from the copper acetate, nevertheless the conversion of the latter into Paris green will progress unhampered by the presence of the lead sulphate.

What I claim is:

1. The process of making an arsenic compound which consists in reacting on a lead salt with copper sulphate in an acid medium, converting the resultant lead sulphate into the hydroxide with an alkaline hydroxide and adding arsenic acid.

2. The process of making an arsenic compound of lead which consists in reacting on an oxidized compound of lead with copper sulphate in the presence of acetic acid, converting the resultant lead sulphate into the hydroxide with an alkaline earth metal hydroxide and adding arsenic acid.

3. The process of making an arsenic compound of lead which consists in reacting on an oxidized compound of lead with copper sulphate in the presence of acetic acid, converting the resultant lead sulphate into the hydroxide with magnesium hydroxide and adding arsenic acid.

4. The process of making an arsenic compound which consists in reacting on a quantity of a lead salt with copper sulphate in an acid medium, converting the resultant lead sulphate into lead hydroxide with magnesium hydroxide, filtering, adding arsenic acid to the precipitate and converting a further quantity of the lead sulphate for combination with the arsenic acid by treating the sulphate with the magnesium hydroxide recovered from the filtrate by the addition of an alkali.

5. The process of making an arsenic compound which consists in reacting on copper sulphate with acetic acid in the presence of lead acetate and adding arsenious oxide and copper oxide to the copper acetate.

6. The process of making an arsenic compound which consists in reacting on copper sulphate with acetic acid in the presence of lead acetate, filtering and adding arsenious oxide and copper oxide to the filtrate.

In testimony whereof, I have hereunto affixed my signature.

NORMAN UNDERWOOD.